United States Patent [19]

Mattes et al.

[11] Patent Number: 4,707,383

[45] Date of Patent: Nov. 17, 1987

[54] PROCESS FOR COATING GLASS WITH A FILM OF TIN OXIDE

[75] Inventors: Gunther Mattes; Gunter Ortmanns, both of Aachen, Fed. Rep. of Germany

[73] Assignee: Saint Gobain Vitrage, Neuilly-sur-Seine, France

[21] Appl. No.: 788,509

[22] Filed: Oct. 18, 1985

Related U.S. Application Data

[63] Continuation of Ser. No. 428,078, Sep. 29, 1982, abandoned, which is a continuation of Ser. No. 243,750, Mar. 16, 1981, abandoned, which is a continuation-in-part of Ser. No. 240,407, Mar. 4, 1981, abandoned.

[30] Foreign Application Priority Data

Mar. 15, 1980 [DE] Fed. Rep. of Germany ....... 3010077

[51] Int. Cl.$^4$ ................................................ B05B 5/06
[52] U.S. Cl. ..................................... 427/168; 427/160; 427/164; 427/166; 427/226
[58] Field of Search ............... 427/160, 164, 168, 166, 427/226

[56] References Cited

U.S. PATENT DOCUMENTS

| | | | |
|---|---|---|---|
| 2,567,331 | 9/1951 | Gaisgr et al. | 117/54 |
| 3,677,814 | 7/1972 | Gillery | 117/211 |
| 3,959,565 | 5/1976 | Jordan et al. | 428/432 |
| 4,041,060 | 8/1977 | de Haan | 260/429.7 |
| 4,146,657 | 3/1979 | Gordon | 427/166 X |
| 4,172,159 | 10/1979 | Marcault | 427/160 |
| 4,182,783 | 1/1980 | Henery | 118/719 X |

FOREIGN PATENT DOCUMENTS

| | | |
|---|---|---|
| 1482315 | 6/1975 | United Kingdom . |
| 1525795 | 6/1975 | United Kingdom . |
| 1520124 | 9/1975 | United Kingdom . |
| 1482316 | 8/1977 | United Kingdom . |
| 1488557 | 10/1977 | United Kingdom . |

*Primary Examiner*—Janyce A. Bell
*Attorney, Agent, or Firm*—Pennie & Edmonds

[57] ABSTRACT

An improved process for coating the surface of a transparent refractory material such as glass with a semi-reflective film of tin oxide by depositing finely divided particles of a pyrolytically decomposable organotin compound on the surface of a substrate which has been heated to a temperature of between about 400° and 650° C. The finely divided organotin compound has a particle size not greater than about 20 microns. Before deposition, the organotin compound is mixed with a predetermined amount of finely divided particles of a compound containing a halogen constituent. Deposition is accomplished by suspending the mixture of both compounds in an anhydrous carrier gas which is projected onto the surface of the substrate. In an alternative process, a single compound containing both tin and halogen constituents is projected onto the surface of the preheated substrate by means of the anhydrous carrier gas.

15 Claims, No Drawings

PROCESS FOR COATING GLASS WITH A FILM OF TIN OXIDE

This application is a continuation of Ser. No. 428,078, filed Sept. 29, 1982, abandoned, which is a continuation of Ser. No. 243,750, filed Mar. 16, 1981, abandoned, which is a continuation-in-part of Ser. No. 240,407, filed Mar. 4, 1981, abandoned.

BACKGROUND OF THE INVENTION

1. Field of the Invention

This invention relates to an improved process for coating the surface of a transparent refractory material such as glass with a adherent film of tin oxide by projecting a pyrolytically decomposable tin compound onto the surface of a heated substrate.

2. Description of the Prior Art

Processes for the pyrolytic deposition of metallic oxide films on surfaces of transparent refractory materials, such as glass sheets, are well known. In general, the substrate on which the deposition is accomplished is heated to a high temperature but one below its softening point. A tin compound that decomposes by pyrolysis upon contact with the heated substrate is deposited on the substrate's surface. As a result of the ensuing chemical reaction, a heat-reflective, transparent, adherent film of tin oxide is formed on the surface of the substrate.

French Pat. No. 2,277,049 discloses a process in which an organometallic compound in granular form is suspended in an adhydrous gas current which is projected against the heated surface of the substrate to be coated. These prior art processes, however, all possess significant drawbacks with respect to continuity of the final coating or the difficulty involved in applying the coating.

U.S. Pat. No. 4,172,159 discloses a process for coating the surfaces of a transparent refractory material that allegedly avoids the problems existing in the more conventional prior art processes. In this process, the anhydrous carrier gas contains, in addition to finely divided particles of an organotin compound, an anhydrous gaseous fluoride compound which is introduced into the carrier gas at a point upstream from the nozzle that projects the gas stream onto the surface of the substrate.

It has been discovered, however, that this process does not insure a constant ratio between the amounts of tin and fluorine deposited onto the surface of the substrate. A constant ratio between the two constituents is required in order to produce uniform layers of coating. This is important in all commercial applications, particularly in manufacturing transparent glass used in constructing windows. Moreover, because of the manner in which the fluoride and tin compounds are mixed, the process involves the use of costly regulating devices which still do not insure that a uniform, homogeneous layer will be deposited.

The improved process of the present invention completely eliminates the necessity for employing costly regulating devices, allows the tin/fluoride ratio of the coating to be precisely regulated, and produces homogeneous layers which are superior to those produced by any of the prior art processes.

SUMMARY OF THE INVENTION

We have discovered a new and improved process for coating a transparent refractory material with a transparent film of tin oxide that eliminates the problems inherent in the prior art processes. First, the refractory substrate is heated to a temperature between about 400° and 650° C. Finely divided particles of a pyrolytically decomposable organotin compound are uniformly mixed with a desired amount of a compound containing halogen constituents in powder form. The organotin compound has a particle size of not greater than about 20 microns. The resulting mixture is suspended in an anhydrous carrier gas which is projected onto the surface of the substrate to be coated. The organotin compound pyrolytically decomposes on contact with the heated substrate thereby forming the desired coating. In an alternative process, a single compound containing both tin and halogen constituents is projected onto the preheated substrate by means of the carrier gas.

DETAILED DESCRIPTION OF THE INVENTION

The transparent refractory material to be coated with a film of tin oxide is heated to a temperature above that at which the organotin compound employed will phrolytically decompose but below the softening temperature of the refractory material. This is generally in the range of about 400° to 650° C. A mixture containing a predetermined amount of a finely divided pyrolytically decomposable organotin compound and a compound containing halogen constituents is powder form is suspended in an anhydrous carrier gas. The gas is then projected onto the surface of the heated substrate. The organotin compound pyrolytically decomposes on contact with the heated substrate to form an adherent film of tin oxide on the surface. The finely divided organotin compound should have a particle size of not more than about 20 microns and should pyrolytically decompose to form tin oxide at a temperature below the softening temperature of the substrate material.

The material to be coated may be any conventional transparent refractory material such as a glass sheet or a vitreous ceramic material or a sheet of "floated" glass. The anhydrous carrier gas is advantageously dry air or nitrogen.

In an alternative process, finely divided particles of a single compound containing both tin and fluoride constituents in a predetermined ratio are projected onto the heated substrate using the carrier gas. If the tin/fluoride ratio corresponds to the ratio desired in the final coating, the compound can be deposited on the heated surface without additions. However, if a different tin/fluoride ratio is desired, another compound having the desired ratio can be used or a second compound which modifies the original tin/fluoride ratio can be added to the mixture.

Examples of self-doping organotin compounds include those corresponding to the formula:

$$[R_a X_b Sn]_c O_d$$

wherein:
R is an alkyl, aryl, alkylaryl or aralkyl radical;
X is a halogen, preferably fluorine;
c equals 1 or 2;
d equals 0 or 1.
Furthermore,
when c=1 and d=0, a+b=4
(a,b=whole numbers from 0 to 4);
when c=1 and d=1, a+b=2
(a,b=whole numbers from 0 to 2);
when c=2 and d=1, a+b=3.

(a,b=whole numbers from 0 to 3).

The following examples are illustrative and do not limit the practice of the present invention.

EXAMPLE 1

The transparent refractory material to be coated is heated to a temperature above that at which the organotin compound employed will pyrolytically decompose but below the softening temperature of the refractory material. From 20 to 65% by weight of powdered dibutyltin oxide having a particle size not greater than 20 microns is thoroughly mixed with from 80 to 35% by weight of powdered dibutyltin difluoride. A tin/fluoride ratio of between 100:10.3 and 100:25.2 is obtained. This mixture is introduced into a reservoir By means of an electronically regulated dosing system the mixture is picked up by an anhydrous carrier gas which is transmitted to a slit nozzle placed horizontally in a stationary position above the surface to be coated. In a closed reaction chamber, the carrier gas is forced through the slit nozzle onto the heated surface. The organotin compound pyrolytically decomposes on contact with the heated substrate to form an adherent film of tin oxide on the surface. Any excess powder as well as the by-products formed during pyrolysis are removed by an adjustable asperation system which is present in the closed reaction chamber.

The rate of passage of the glass under the slit nozzle is a function of feed of the carrier gas containing the organotin compound. When the amount of the organotin compound deposited on the substrate is 2 g/m$^2$, a tin oxide layer with a thickness of 80 nm is produced in which the proportion of reflected radiation in the 2 to 50 micron range is 40%. When the amount of the organotin compound deposited on the substrate is 10 g/m$^2$, a tin oxide layer with a thickness of 700 nm is produced in which the proportion of reflected radiation in the 2 to 50 micron range is 75%.

EXAMPLE 2

Using the process disclosed in Example 1, a self-doping dibutyltin difluoride having a particle size of not greater than about 20 microns is deposited on the surface of a heated substrate. Since this compound has a tin/fluoride ratio of 100:32, the final layer deposited on the surface should closely approximate this ratio.

EXAMPLE 3

Using the process disclosed in Example 1, a self-doping dibutyltin ammonium tetrafluoride complex of the formula (NH$_4$)$_2$[(n—C$_4$H$_9$)$_2$SnF$_4$] having a particle size not greater than about 20 microns is deposited on the surface of a heated substrate. Since this compound has a tin/fluoride ratio of 100:64, the final layer deposited on the surface should closely approximate this ratio.

EXAMPLE 4

Using the process disclosed in Example 1, a self-doping dibutyltin trifluoroacetate of the formula (n-C$_4$H$_9$)$_2$Sn(CF$_3$COO)$_2$ having a particle size not greater than about 20 microns is deposited on the surface of a heated substrate. Since this compound has a tin/fluoride ratio of 100:96, the final layer deposited on the surface should closely approximate this ratio.

We claim:

1. A process for forming a coating of tin oxide on the surface of a transparent refractory substrate material which comprises:

heating the substrate material to a temperature of from about 400° to 650° C.;

mixing a predetermined amount of finely divided particles of a dry, pyrolytically decomposable organic tin oxide having a particle size of not greater than about 20 microns and being pyrolytically decomposable at a temperature below that of the heated substrate with a predetermined amount of a dry dibutyl tin halogen containing compound in powder form, said compound selected from the group dibutyl tin difluoride, dibutyl tin ammonium tetrafluoride and dibutyl tin trifluoroacetate;

suspending said dry powder mixture in an anhydrous gas carrier in the absence of a fluoride containing gas or an organic solvent;

projecting said powder mixture and carrier gas onto said heated substrate; and pyrolytically decomposing said powder mixture upon the surface of the heated substrate to form an adherent coating of tin oxide thereon.

2. The process of claim 1 wherein the organotin powder is dibutyltin oxide.

3. The process of claim 1 wherein the anhydrous gas carrier is dry air or nitrogen.

4. The process of claim 1 wherein the amount of said organotin powder is about 20 to 65 weight percent and the amount of dibutyl tin halogon containing compound is about 35 to 80 weight percent.

5. A process for forming a coating of tin oxide on the surface of a transparent refractory substrate material which comprises:

heating the substrate material to a temperature of from about 400° to 650° C.;

suspending in an anhydrous gas carrier in the absence of a fluoride containing gas or an organic solvent, a dry self-doping dibutyl tin halogen containing powder selected from the group dibutyltin difluoride, dibutyltin ammonium tetrafluoride and dibutyltin trifluoroacetate said powder having a particle size of not greater than about 20 microns and being pyrolytically decomposable at a temperature below that of the heated substrate;

projecting said suspended powder onto the surface of said heated substrate; and pyrolytically decomposing said dibutyl tin halogen containing powder on contact with the surface of the heated substrate to form an adherent coating of tin oxide on said surface.

6. The process of claim 5 wherein the anhydrous carrier gas is dry air or nitrogen.

7. A process for forming a coating of tin oxide on the surface of a transparent refractory substrate material which comprises:

heating the substrate material to a temperature of from about 400° to 650° C.;

mixing an amount of from about 20 to 65% by weight of a dry, finely divided pyrolytically decomposable organic tin oxide powder having a particle size of not greater than 20 microns and being pyrolytically decomposable at a temperature below that of the heated substrate with from about 35 to 80% by weight of a dry organic tin halogen containing compound in powdered from said compound selected from the group dibutyltin difluoride dibutyltin ammonium tetrafluoride and dibutyltin trifluoroacetate;

suspending said mixture in an anydrous gas carrier in the absence of a fluoride containing gas or an organic solvent;

projecting said powder mixture and gas carrier onto the heated surface of said substrate; and pyrolytically decomposing said powder mixture upon the surface of the heated substrate to form an adherent coating of between 80 and 700 nm of tin oxide on said surface.

8. The process of claim 7 wherein the organic tin oxide powder is dibutyltin oxide.

9. A process for forming a coating of tin oxide on the surface of a transparent refractory substrate material which comprises:

heating the substrate material to a temperature of from about 400° to 650° C.;

suspending in an anhydrous gas carrier in the absence of a fluoride containing gas or an organic solvent, a dry, self-doping dibutyl tin halogen containing powder selected from the group dibutyl tin difluoride and dibutyltin ammonium tetrafluoride, dibutyltin trifluoroacetate said powder having a particle size of less than 20 microns and being pyrolytically decomposable at a temperature below that of the heated substrate;

projecting said suspended powder upon said heated substrate; and pyrolytically decomposing said dibutyl tin halogen containing powder on contact with the surface of the heated substrate to form an adherent coating of between 80 and 700 nm of tin oxide on said surface.

10. The process of claim 9 wherein the anhydrous carrier gas is dry air or nitrogen.

11. A process for forming a coating of tin oxide on the surface of a glass substrate which consists essentially of:

heating the glass to between 400° and 650° C.;

mixing from 20 to 65% by weight of finely divided particles of dibutyltin oxide powder having a particle size of not greater than about 20 microns with from 35 to 80% by weight of a dibutyltin difluoride powder;

suspending said powder mixture in dry air or nitrogen in the absence of a fluoride containing gas or an organic solvent;

projecting said powder mixture onto the surface of the heated glass; and pyrolytically decomposing said powder mixture on contact with the surface of the heated glass to form an adherent coating of tin oxide on said surface.

12. A process for forming a coating of tin-oxide on the surface of a glass substrate which consists essentially of:

heating the glass to between 400° and 650° C.;

suspending in dry air or nitrogen in the absence of a fluoride containing gas or an organic solvent a dry self-doping organic tin fluoride powder of dibutyl tin difluoride, dibutyl tin ammonium tetrafluoride and dibutyl tin trifluoroacetate, said powder having a particle size of less than about 20 microns;

projecting said suspended powder onto the surface of said heated substrate; and pyrolytically decomposing said self-doping organic tin fluoride powder on contact with the surface of the heated substrate to form an adherent coating of tin oxide on said surface.

13. A process for forming a coating of tin-oxide on the surface of a glass substrate comprising:

heating the glass substrate to a temperature of between about 400° and 650° C.;

suspending in an anhydrous gas carrier in the absence of a fluoride containing gas or an organic solvent a self doping organotin compound of the formula:

$$[R_a X_b Sn]_c O_d$$

wherein
R is an alkyl, aryl, alkylaryl or aralkyl radical;
X is a halogen;
a or b is 0,1,2,3, or 4
c is 1 or 2; and
d is 0 or 1;
such that when c=1 and d=0, a+b=4; when c=1 and d=1 a=b=2, and when c=2 and d=1, a+b=3;

said compound in the form of a powder having a particle size of not greater than 20 microns and being pyrolytically decomposable at a temperature below that of the heated substrate; and projecting said suspended powder compound onto the surface of the heated substrate so as to pyrolytically decompose the compound upon contact with the heated glass, thus forming an adherent coating of tin oxide upon the surface of the glass.

14. The process of claim 13 wherein the halogen is fluorine.

15. The process of claim 13 wherein the self doping organotin compound is dibutyl tin difluoride.

* * * * *